US011524571B2

(12) United States Patent
Moon et al.

(10) Patent No.: US 11,524,571 B2
(45) Date of Patent: Dec. 13, 2022

(54) LIQUID LEVEL DETECTING APPARATUS OF TANK FOR VEHICLE

(71) Applicants: Hyundai Motor Company, Seoul (KR); Kia Motors Corporation, Seoul (KR)

(72) Inventors: Kee Hoon Moon, Gyeonggi-do (KR); Jong Gyun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 17/026,754

(22) Filed: Sep. 21, 2020

(65) Prior Publication Data

US 2021/0107351 A1 Apr. 15, 2021

(30) Foreign Application Priority Data

Oct. 14, 2019 (KR) .......................... 10-2019-0126591

(51) Int. Cl.
*B60K 15/03* (2006.01)
*G01C 19/00* (2013.01)
*G01F 23/32* (2006.01)
*G01F 23/76* (2006.01)
*G01F 23/56* (2006.01)
(Continued)

(52) U.S. Cl.
CPC .............. *B60K 15/03* (2013.01); *G01C 19/00* (2013.01); *G01F 23/32* (2013.01); *G01F 23/56* (2013.01); *G01F 23/76* (2013.01); *G01F 23/804* (2022.01); *B60K 2015/03217* (2013.01); *B60K 2015/03223* (2013.01); *B60K 2015/0772* (2013.01)

(58) Field of Classification Search
CPC .......... B60K 15/03; B60K 2015/03217; B60K 2015/03223; B60K 2015/0772; G01C 19/00; G01F 23/32; G01F 23/56; G01F 23/76; G01F 23/804
See application file for complete search history.

(56) References Cited

U.S. PATENT DOCUMENTS 5,072,615 A * 12/1991 Nawrocki ............. G01F 23/804
33/366.14
10,175,085 B2 1/2019 Philiben
(Continued)

FOREIGN PATENT DOCUMENTS

| CA | 2715296 A1 * | 4/2011 | ............. G01F 23/30 |
| DE | 102004024513 A1 * | 12/2005 | ............. G01F 23/32 |
| JP | 2004212286 A * | 7/2004 | ............. G01F 23/36 |

(Continued)

*Primary Examiner* — Ryan D Walsh
(74) *Attorney, Agent, or Firm* — Fox Rothschild LLP

(57) ABSTRACT

A liquid level detecting apparatus of a tank for a vehicle is provided. The apparatus includes a main detecting part that detects the liquid level of the liquid in a tank to output a liquid level detection signal corresponding to the liquid level and an auxiliary floater assembly that has an auxiliary floater provided to float on the liquid surface of the liquid in the tank. A gyro sensor is mounted to the auxiliary floater, and an angle detection signal corresponding to an inclined angle of the tank is output by the gyro sensor. A controller determines a final liquid level value by correcting a liquid level value obtained from the liquid level detection signal based on the angle detection signal.

13 Claims, 12 Drawing Sheets

(51) Int. Cl.
    *G01F 23/80*     (2022.01)
    *B60K 15/077*     (2006.01)

(56) References Cited

U.S. PATENT DOCUMENTS

2009/0056436 A1*    3/2009    Miceli ................ G01F 9/008
                                                                              73/290 R
2016/0238426 A1      8/2016    Tetil

FOREIGN PATENT DOCUMENTS

| KR | 19990011439 A | * | 2/1999 | |
|---|---|---|---|---|
| KR | 10-2012-0067016 A | | 6/2012 | |
| KR | 10-1835469 B1 | | 3/2018 | |
| KR | 10-2018-0053913 A | | 5/2018 | |
| WO | WO-2007047340 A2 | * | 4/2007 | ............ B60K 15/03 |

* cited by examiner

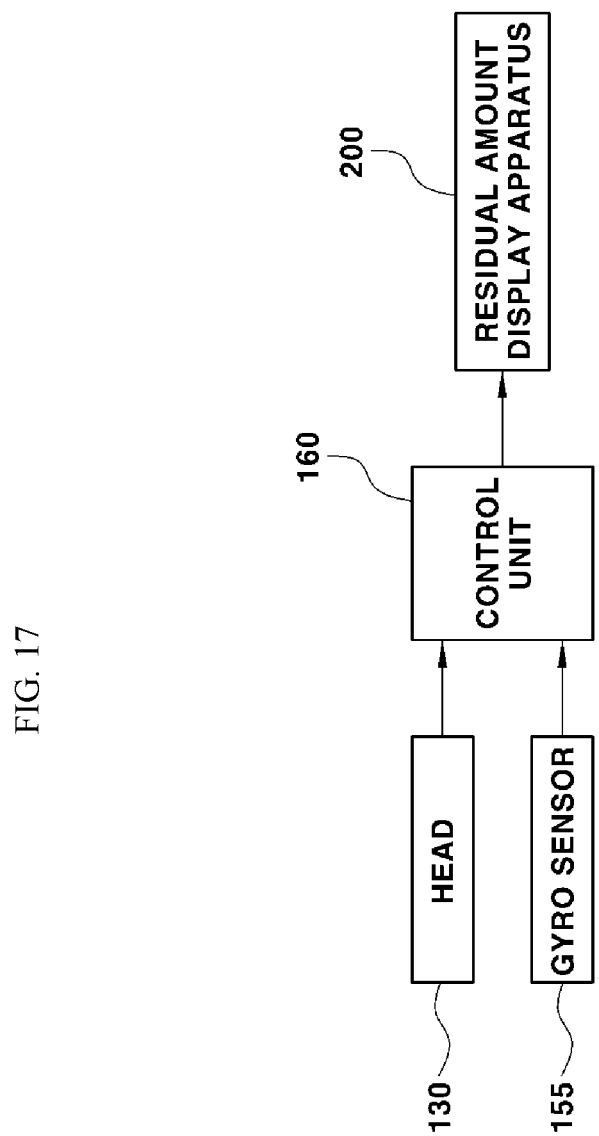

LIQUID LEVEL DETECTING APPARATUS OF TANK FOR VEHICLE

CROSS-REFERENCE TO RELATED APPLICATION

This application claims under 35 U.S.C. § 119(a) the benefit of priority to Korean Patent Application No. 10-2019-0126591 filed on Oct. 14, 2019, the entire contents of which are incorporated herein by reference.

BACKGROUND

(a) Technical Field

The present disclosure relates to a liquid level detecting apparatus of a tank for a vehicle, and more particularly, to a liquid level detecting apparatus, which more accurately detects the liquid level in a tank such as a fuel tank or a urea water tank for a vehicle regardless of the running condition of the vehicle, a tank shape, or the like.

(b) Background Art

In general, a fuel tank for a vehicle is provided with a liquid level detecting apparatus for detecting the liquid level of the fuel, where the liquid level of the fuel indicates the residual amount of the fuel remaining in the fuel tank. Further, in addition to the liquid level detecting apparatus, the vehicle is provided with a residual amount display apparatus that displays the liquid level of the fuel detected by the liquid level detecting apparatus, that is, the current fuel residual amount to be recognizable by a driver. Therefore, the driver is able to confirm the fuel residual amount displayed by the residual amount display apparatus to thus replenish the fuel when necessary.

In a typical vehicle, the liquid level detecting apparatus that detects the liquid level of the fuel is configured to output an electrical signal corresponding to the liquid level of the fuel (e.g., fuel residual amount) in interlock with a position of a floater, and to this end, the floater is installed to move according to the liquid surface change of the fuel in the fuel tank. As described above, an apparatus installed in the fuel tank to detect the liquid level of the fuel by using the floater moving according to the liquid surface change of the fuel is commonly referred to as a fuel sender.

The fuel residual amount display apparatus for the vehicle calculates the fuel residual amount based on a signal output from the fuel sender, and based thereon, the apparatus displays them by calculating a fuel gauge value and a distance to empty of a trip computer (not illustrated), which are vehicle running information, in a cluster. Meanwhile, in the case of the vehicle to which a Selective Catalytic Reduction (SCR) system has been applied, the urea water tank may also be installed together with the fuel tank, and the shapes of the fuel tank and the urea water tank are different according to the vehicle type.

For example, in the case of a commercial bus, a minibus, a passenger vehicle, or the like, the shapes of the fuel tank and the urea water tank have a low height and a wide width mostly due to the limited vehicle layout characteristics. In particular, the urea water tank stores urea water, and in the SCR system, the urea water needs to be filled in the urea water tank as if the fuel is charged since the urea water is continuously used to remove nitrogen oxides during the operation of the vehicle.

Further, to allow the driver to recognize the residual amount of the urea water stored in the urea water tank, the urea water tank, like the fuel tank, is provided with a liquid level detecting apparatus for detecting the liquid level of the urea water. A floater type and a float arm type are known as the liquid level detecting apparatus installed in the fuel tank and the urea water tank. In the floater type, a sender probe is fixedly installed in the tank vertically, and the floater is coupled to move along the vertical longitudinal direction on the sender probe.

In this floater type, the floater moves along the sender probe when moving vertically in interlock with the liquid surface change in the tank, and an electrical signal according to a position of the floater moving along the sender probe is output from the liquid level detecting apparatus. In the float arm type, the floater is provided in a state coupled to the tip of the float arm, and the float arm rotates when the floater moves vertically in interlock with the liquid surface change in the tank, and at this time, the electrical signal according to the movement of the float arm is output from the liquid level detecting apparatus.

However, in a conventional liquid level detecting apparatus, that is, a sender for detecting the liquid level of the fuel in the fuel tank, and a sender for detecting the liquid level of the urea water in the urea water tank, there may occur an error in the liquid level detection due to the inclination of the vehicle. In particular, in a tank having a low height and a wide width shape, there may easily occur an error in the liquid level detection due to the inclination of the vehicle, and a small or large amount may be detected as compared to the actual residual amount in the tank as the residual amount error increases.

Further, if the vehicle is operated or driven on the ramp, and if the vehicle travels the road that uphill or downhill is continuous or repeated, it is difficult to detect the accurate liquid level of the residual amount in the tank, and it may be impossible to recognize and display the accurate liquid level in the vehicle, and thus, the fuel or the urea water may not be replenished in a timely manner.

FIGS. 1, 2A, and 2B are diagrams for explaining the problem of the related art, and have been illustrated that an error in the liquid level detection may occur on the ramp, for example, of a floater type fuel sender. As illustrated, a floater-type fuel sender 10 includes a sender probe 11 fixedly installed vertically in the fuel tank 1, and a floater 12 provided to be coupled to be guided to the sender probe 11 along the vertical longitudinal direction thereof. In this configuration, the floater 12 moves along the sender probe 11 in interlock with a change in the liquid surface of the fuel in the fuel tank 1, and the electrical signal corresponding to the liquid level of the fuel (e.g., fuel residual amount) according to the position of the floater 12 on the probe 11 is output from a head 13 of the fuel sender 10.

Referring to FIGS. 1, 2A, and 2B, the state of the fuel tank is illustrated when the vehicle is positioned on the flat and the ramp, and the fuel tank 1 for the vehicle maintains the horizontal state on the flat (see FIG. 1), but the fuel tank 1 is inclined to either side on the ramp (see FIGS. 2A and 2B). On the other hand, the liquid surface of the fuel in the fuel tank 1 always maintains the horizontal state by gravity regardless of the inclination of the fuel tank as shown in the drawings. Therefore, even if the liquid level (e.g., residual amount) of the fuel in the fuel tank 1 is the same, the position and height of the liquid surface in the probe 11 are inevitably different from each other on the flat and the ramp, and the position and height of the floater 12 always positioned on the liquid surface in the probe 11 are inevitably different from each other on the flat and the ramp as well.

Accordingly, in the conventional liquid level detecting apparatus, a liquid level detection error occurs in which the liquid level is detected differently on the flat and the ramp, and as a result, a difference is inevitably shown even in the fuel residual amount displayed on the cluster, which is the residual amount display apparatus.

The above information disclosed in this section is merely for enhancement of understanding of the background of the disclosure and accordingly it may contain information that does not form the prior art that is already known in this country to a person of ordinary skill in the art.

SUMMARY

Therefore, the present disclosure provides a liquid level detecting apparatus, which may more accurately detect a liquid level in a tank such as a fuel tank or a urea water tank for a vehicle regardless of the running condition or the tank shape of the vehicle.

For achieving the object, according to an exemplary embodiment of the present disclosure, provided is a liquid level detecting apparatus of a tank for a vehicle including a main detecting part configured to detect the liquid level of the liquid in a tank to output a liquid level detection signal corresponding to the liquid level; an auxiliary floater assembly including an auxiliary floater provided to float on the liquid surface of the liquid in the tank, and a gyro sensor mounted to the auxiliary floater, and configured so that an angle detection signal corresponding to an inclined angle of the tank is output in the gyro sensor; and a controller configured to determine a final liquid level value by correcting a liquid level value obtained from the liquid level detection signal based on the angle detection signal. In particular, the main detecting part may include a sender probe installed in the tank; a main floater provided to move along the sender probe in interlock with a change in the liquid surface of the liquid in the tank; and a head for generating and outputting the liquid level detection signal according to a position of the main floater in the sender probe.

Further, the auxiliary floater assembly may include a base part installed to be movable vertically along a fixed structure in the tank; a gyro sensor part having a gyro sensor connected and supported to the base part through an arm rod, and configured to output the angle detection signal that corresponds to the rotated and inclined angle; and an auxiliary floater provided to float on the liquid surface of the liquid in the tank, and installed so that the gyro sensor part is rotatable. The fixed structure in the tank may be a pipe fixedly disposed vertically and lengthily in the tank, and the base part may be provided in a cylindrical shape to be fitted into the outer circumference of the pipe and therefore, may be rotatable in the pipe while being movable vertically along the pipe.

Additionally, the arm rod may be provided in the form of a hollow tube, a wire connected to the gyro sensor to deliver the angle detection signal may be installed along the interior of the arm rod, and the wire may pass through the interior of the arm rod and then may be wound around the pipe in a spiral form to be connected to the outside of the auxiliary floater assembly. The gyro sensor part may be installed to be rotatable above the auxiliary floater, and a groove part of a predetermined depth, into which at least a portion of the gyro sensor part rotated thereon may be inserted, may be formed on the upper portion of the auxiliary floater.

The auxiliary floater and the gyro sensor part may have a rectangular parallelepiped shape, and the groove part, into which the end portion of the rotated gyro sensor part may be inserted, may be formed on the upper portion of the auxiliary floater at a certain depth. The gyro sensor part may be hinge-coupled to the central position of the auxiliary floater in the longitudinal direction, and the arm rod may be connected to a portion spaced at a predetermined distance apart from a portion hinge-coupled to the auxiliary floater among the gyro sensor part.

Further, a drain hole, through which the liquid filled in the groove part may be discharged, may be formed through the upper portion of the auxiliary floater. The gyro sensor part may include a case rotatably coupled to the auxiliary floater; a housing accommodated in and fixed to the interior of the case; a gyro sensor inserted into and fixed to the interior of the housing; and a cover installed in the case into which the housing and the gyro sensor have been inserted to enclose the interior of the case.

The main detecting part may include a sender probe installed in the tank; and a main floater provided to move along the sender probe in interlock with a change in the liquid surface of the liquid in the tank, and in the controller, when the inclined angle of the gyro sensor part obtained from the angle detection signal is $\alpha$, the length of a connection line connected perpendicular to the longitudinal directional axis of the sender probe of the main detecting part in the gyro sensor part is a base length, and the distance between a point to which the connection line is connected vertically in the axis of the sender probe and the main floater is a height, the height from the $\alpha$ and the base length may be calculated using the relationship of 'tan $\alpha$=height/base length,' and the corrected final liquid level value may be obtained as a value obtained by adding or subtracting the height to or from the liquid level value obtained from the liquid level detection signal.

In addition, in the controller, the inclined direction of the tank may be determined from the angle detection signal, and the height may be added to or subtracted from the liquid level value according to the inclined direction of the tank. The controller may be configured to perform the correction, when a state where the angle obtained from the angle detection signal corresponds to a predetermined normal area is maintained for a setting time, and the liquid level value obtained from the liquid level detection signal is a value of a predetermined lower limit value or more.

Further, in the controller, a normal area may be 0 or more, and may be set to an area that is a predetermined maximum inclined angle or less, and the controller may be configured to determine a state where the angle obtained from the angle detection signal corresponds to the normal area, when the absolute value of the angle obtained from the angle detection signal is 0 or more and the maximum inclined angle or less.

Therefore, according to the liquid level detecting apparatus of the tank for the vehicle according to the present disclosure, it may be possible to more accurately detect the liquid level in the tank, such as the fuel tank or the urea water tank for the vehicle regardless of the running condition, the tank shape, or the like of the vehicle, and to more accurately detect the residual amount of the fuel or the urea water in the tank regardless of a change in the operating state of the vehicle by enabling the error correction of the tank capacity. As a result, it may be possible to replenish the fuel and the urea water at an appropriate time before the fuel or the urea water is exhausted, thereby enhancing the efficiency of the vehicle operation, preventing damage to parts or the turn-off of the engine due to the exhaustion of the fuel and the urea water, or the like.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein:

FIG. 17 is a diagram illustrating a configuration for detecting the liquid level in the present disclosure.

Figure 1:
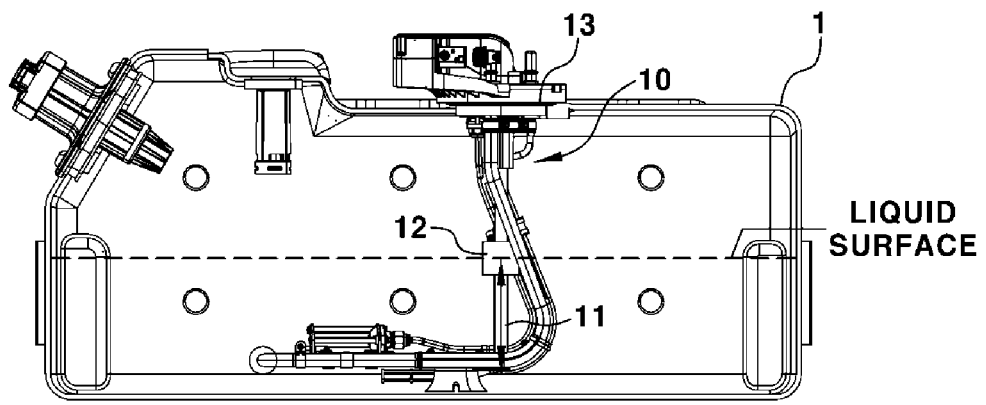
FIGS. 1, 2A, and 2B are diagrams for explaining the problem of the related art.
Figure 2A:
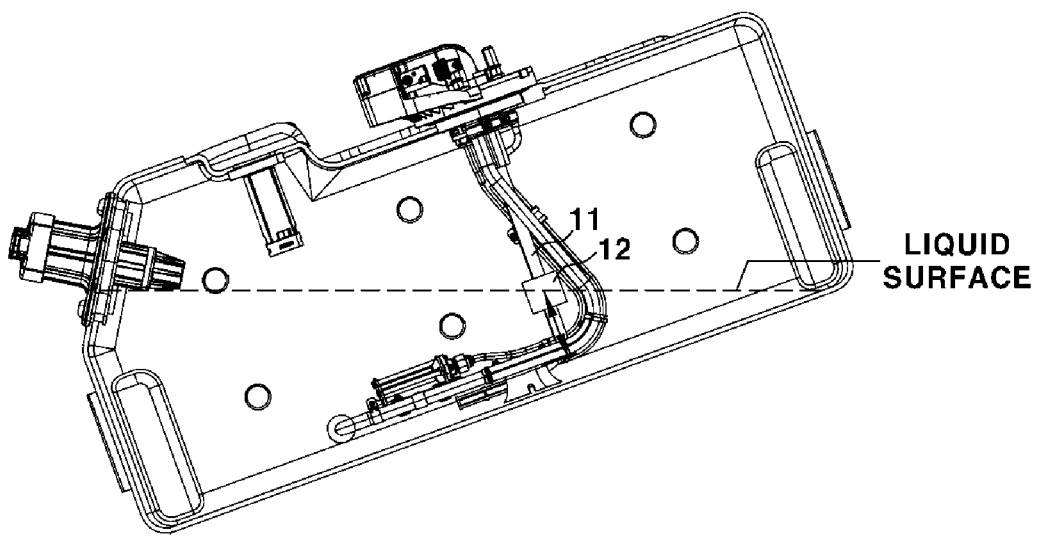
Figure 2B:
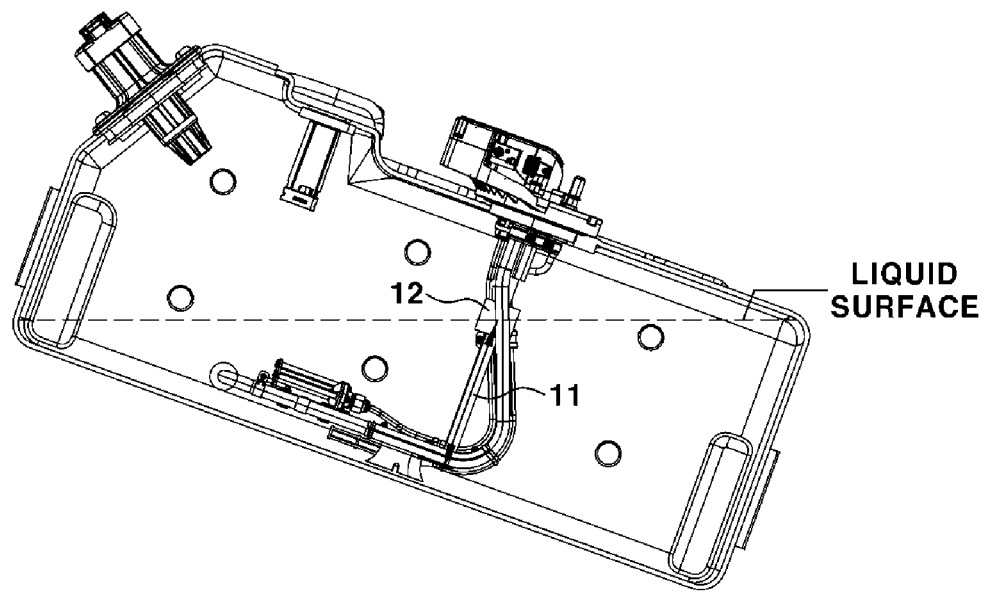

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art to which the present disclosure pertains may easily carry out the present disclosure. However, the present disclosure is not limited to the exemplary embodiments described herein and may also be embodied in other forms.

The present disclosure may be applied to a tank in which a liquid such as fuel or urea water is stored, such as a fuel tank and a urea water tank in a vehicle, and relates to a liquid level detecting apparatus of the tank for the vehicle, which may more accurately detect the liquid level indicating the residual amount of the liquid in the tank. In particular, the present disclosure relates to a liquid level detecting apparatus, which may more accurately detect the liquid level in the tank regardless of the running condition (e.g., the road state such as the flat and the ramp) of the vehicle, the tank shape, or the like.

The liquid level detecting apparatus according to the present disclosure may improve a known floater type sender including a sender probe installed vertically inside a tank, and a floater coupled to be movable vertically along the sender probe, and uses by additionally installing the floater for the correction in the tank and at this time, the additionally installed floater is mounted with a gyro sensor.

As described above, the present disclosure is mainly characterized in that the liquid level (e.g., liquid residual amount) may be more accurately measured by additionally using the separate floater mounting the gyro sensor even if the liquid surface in the tank has been inclined. In the following description, the sender may be understood as the same meaning as the liquid level detecting apparatus for detecting the liquid level in the tank to output and transmit an electrical signal, and may be a fuel sender configured to detect the liquid level of the fuel in the fuel tank or a urea water sender for detecting the liquid level of the urea water in the urea water tank.

Figure 3:
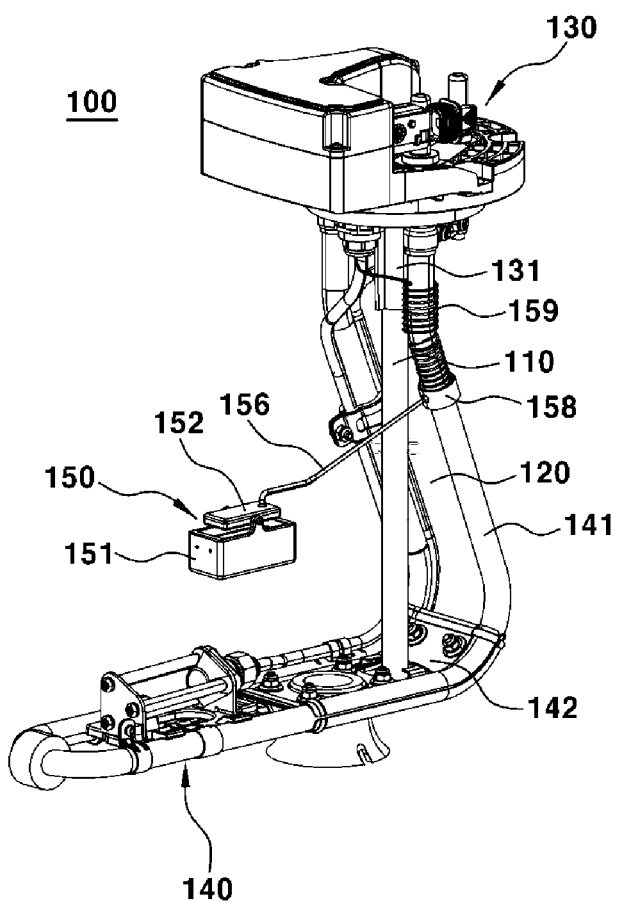
FIG. 3 is a perspective diagram illustrating a liquid level detecting apparatus according to an exemplary embodiment of the present disclosure.

FIG. 3 is a perspective diagram illustrating a liquid level detecting apparatus according to an exemplary embodiment of the present disclosure, and as illustrated, the liquid level detecting apparatus according to an exemplary embodiment may further include a separate floater mounted with a gyro sensor as described above in addition to the components of a known floater type sender including a probe and a floater. In the following description, for distinguishing the floater, the known floater coupled to the probe to be movable vertically along longitudinal direction will be referred to as a 'main floater,' and a newly added floater in the present disclosure, that is, the separate floater mounted with the gyro sensor as described above will be referred to as an 'auxiliary floater.'

Referring to FIG. 1, a probe 110 of a liquid level detecting apparatus 100 may be installed to be vertically disposed inside a tank (not illustrated), and may be supported by a head 130 fixedly installed outside the tank, and a supporter 140 installed inside the tank in a state coupled to the head 130. The head 130 includes components for generating and transmitting the electrical signal as internal components, and may be fastened and mounted to the outside surface of the tank to be positioned outside the tank.

The supporter 140 may include a pipe 141 coupled to the head 130, and a plate 142 coupled to the pipe 141, and the lower end portion of the probe 110 may be coupled to the plate 142. At this time, the probe 110 may be supported in a state coupled to the head 130 and the supporter 140 inside the tank, the upper end portion of the probe 110 may be coupled to the head 130 via a fixer 131, and the lower end portion of the probe 110 may be supported in a state coupled to the plate 142 of the supporter 140 to prevent shaking.

The main floater 120 may be coupled to the probe 110 to be movable vertically along the longitudinal direction, and the main floater 120 may be provided in a cylindrical shape and fitted into and coupled to the probe 110 to become the form in which the probe 110 penetrates the inside thereof. In the present disclosure, the main floater 120 is a known floater that is already applied to the conventional floater type sender for the vehicle, and is a floater coupled to the probe 110 to be guided vertically along the longitudinal direction thereof.

In the present disclosure, when the main floater 120 moves along the probe 110 in interlock with a change in the liquid surface in the tank, the electrical signal, that is, the liquid level detection signal, according to the position of the main floater 120 on the probe 110 may be output from the head 130. In addition, since the fact that the electrical signal (e.g., the liquid level detection signal of the floater type sender) according to the position of the main floater 120 is output from the head 130 of the floater type sender is known, a detailed description thereof will be omitted. Therefore, the liquid level detection signal output from the head 130 may be delivered to a cluster, and thus, the current fuel (or urea water) residual amount calculated from the liquid level detection signal may be displayed through the cluster.

Meanwhile, the liquid level detecting apparatus 100 according to an exemplary embodiment of the present disclosure may further include an auxiliary floater assembly 150 having an auxiliary floater 151 mounted with a gyro sensor, separately from the main detecting part configured to detect the liquid level in the tank, and the auxiliary floater assembly 150 may also be installed inside the tank. In particular, the main detecting part refers to the conventional floater type sender including the probe 110 and the main floater 120.

In an exemplary embodiment of the present disclosure, the auxiliary floater assembly 150 may be mounted to be supported by the supporter 140 inside the tank, and may include the auxiliary floater 151, a gyro sensor part 152, an arm rod 156, and a base part 158. Particularly, the auxiliary floater 151 is a floater provided to float on the liquid surface in the tank like the main floater 120, which is also a floater that moves vertically in interlock with a change in the liquid surface in a state contacting the liquid surface in the tank.

When the vehicle is positioned on the flat surface, the liquid surface in the tank is in a horizontal state, and even if the vehicle is positioned on the ramp, the liquid surface in the tank always maintains the horizontal state, and at this time, the auxiliary floater 151 is supposed to float in a state of always maintaining the same angle as the liquid surface described above. In other words, the auxiliary floater 151 is provided to float in a horizontal state always like the liquid surface, and FIG. 4 is an enlarged perspective diagram illustrating the auxiliary floater 151 and the gyro sensor part 152 of the auxiliary floater assembly in the liquid level detecting apparatus according to an exemplary embodiment of the present disclosure.

Figure 4:
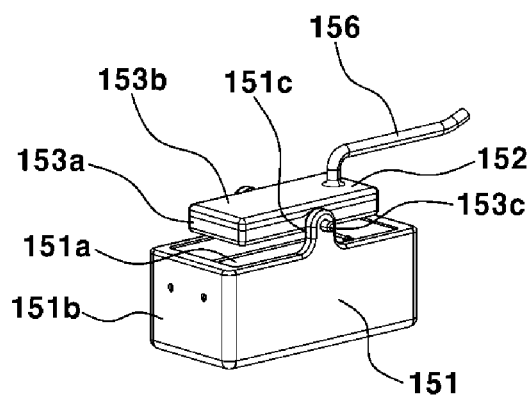
FIG. 4 is an enlarged perspective diagram illustrating an auxiliary floater and a gyro sensor part of an auxiliary floater assembly in the liquid level detecting apparatus according to an exemplary embodiment of the present disclosure.

As illustrated in FIG. 4, the auxiliary floater 151 may have a rectangular parallelepiped shape, and a groove part 151a having a predetermined depth may be formed on the upper portion of the auxiliary floater 151. The groove part 151a provides a space for the rotation and operation of the gyro sensor part 152 to be described later, and specifically, the gyro sensor part 152 installed above the auxiliary floater 151 is used as an interference avoidance space that allows the rotation without interference with the auxiliary floater 151 within a predetermined angle range.

A hinge coupling part 151c to which the gyro sensor part 152 is rotatably coupled may be formed on the upper portion of the auxiliary floater 151, and the hinge coupling part 151c may be formed at the central position in the longitudinal direction on the upper portion of the auxiliary floater 151. The hinge coupling part 151c may be formed to be protruded upward from both left and right sides of the upper portion of the auxiliary floater 151, which is a portion to which the gyro sensor part 152 is hinge-coupled in the auxiliary floater 151, and a hinge pin 153c of the gyro sensor part 152 may be rotatably coupled thereto.

A portion to which the arm rod 156 is connected in the gyro sensor part 152 may be a portion spaced at a predetermined distance apart from the hinge pin 153c, which is a portion hinge-coupled to the auxiliary floater 151, and for example, the arm rod 156 may be connected to one side end portion of the longitudinal direction in the gyro sensor part 152. Therefore, the gyro sensor part 152 may be freely rotatable around the hinge coupling part 151c and the hinge pin 153c above the auxiliary floater 151, and in particular, the gyro sensor part 152 rotates relatively by the amount corresponding to the inclined degree of the tank relative to the liquid surface and the fixed component in the tank with respect to the auxiliary floater 151 always maintaining the horizontal state together with the liquid surface.

As described above, the amount, angle, and the like at which the gyro sensor part 152 has rotated relatively with respect to the auxiliary floater 151 may be a value corresponding to the inclined degree of the tank, and when the gyro sensor part 152 knows the rotation information such as the amount or angle at which the gyro sensor part 152 has rotated relatively, the inclined degree of the tank may be estimated. As a result, it may be possible to use the rotation information of the gyro sensor part 152 rotated relatively with respect to the auxiliary floater 151 as described above as information for correcting the liquid level obtained by the main floater 120.

As described above, the present disclosure may detect the angle at which the gyro sensor part 152 has rotated relatively with respect to the auxiliary floater 151 that always floats on the liquid surface in a horizontal state, and use the detected angle information to correct the liquid level obtained by the main floater 120.

In FIG. 4, a reference numeral 151*b* is a drain hole formed through the upper portion of the auxiliary floater 151, and the drain hole 151*b* may discharge the liquid filled in the groove part 151*a* of the auxiliary floater 151 to the outside, and may be formed to discharge immediately the liquid if the liquid such as the fuel or urea water stored in the tank is filled in the groove part 151*a* of the auxiliary floater 151.

Figure 5:
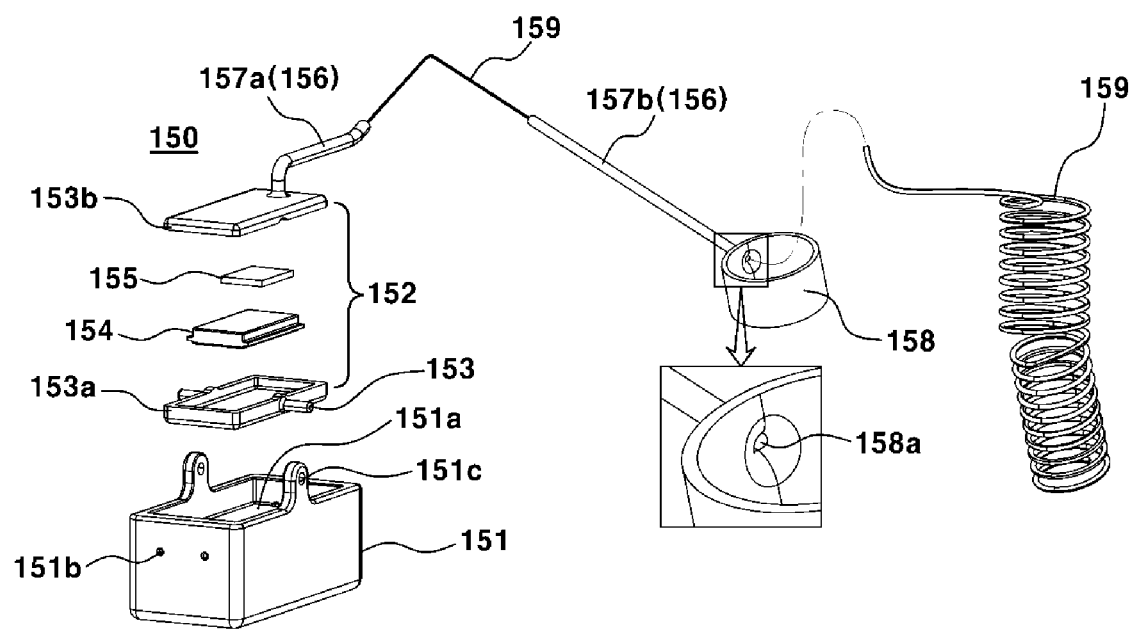
FIG. 5 is an exploded perspective diagram illustrating separately a configuration of the auxiliary floater assembly in the liquid level detecting apparatus according to an exemplary embodiment of the present disclosure.
Figure 6:
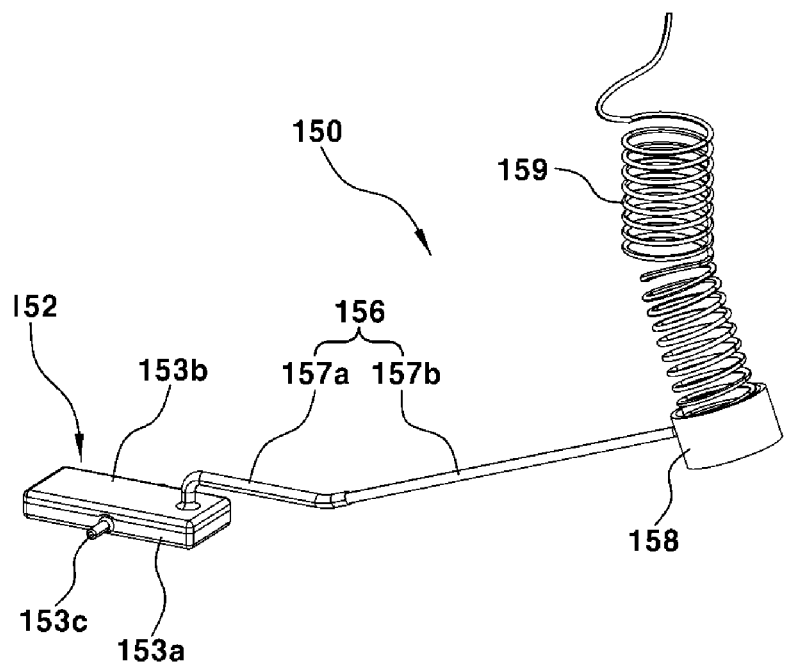
FIG. 6 is an assembling perspective diagram illustrating a gyro sensor part, an arm rod, a base part, and a wire in a configuration of the auxiliary floater assembly in the liquid level detecting apparatus according to an exemplary embodiment of the present disclosure.

FIG. 5 is an exploded perspective diagram illustrating separately a configuration of an auxiliary floater assembly in the liquid level detecting apparatus according to an exemplary embodiment of the present disclosure, and FIG. 6 is an assembling perspective diagram illustrating a gyro sensor part, an arm rod, a base part, and a wire in a configuration of the auxiliary floater assembly in the liquid level detecting apparatus according to an exemplary embodiment of the present disclosure.

In FIG. 6, an illustration of the auxiliary floater is omitted, and the gyro sensor part 152 illustrated as described above is hinge-coupled to enable the free rotation above the auxiliary floater (reference numeral 151 in FIG. 4) (see FIG. 4), and at this time, the hinge pin 153*c* becomes the rotation center of the gyro sensor part 152.

Referring to FIG. 5, the gyro sensor part 152 may include a case 153*a*, a cover 153*b*, a housing 154, and a gyro sensor 155, and has the hinge pin 153*c* formed to be protruded laterally from both left and right side surface portions of the case 153*a*. The case 153*a* provides an accommodating space in which the gyro sensor 155 is accommodated, and may be formed in a rectangular parallelepiped shape to have an internal space thereof accommodate the gyro sensor 155, and the case 153*a* may be fixed integrally to enclose the internal space above the case 153*a* in a state where the gyro sensor 155 has been accommodated in the internal space.

The gyro sensor 155 may be accommodated inside the case 153*a* and the cover 153*b* in a state inserted into and fixed to the housing 154, and a wire 159 for the external connection and the delivery of the angle detection signal may be connected to the gyro sensor 155 inserted into the housing 154. The housing 154 into which the gyro sensor 155 is inserted may be accommodated in the internal space of the case 153*a* and fixed by a method such as adhesion, and the gyro sensor 155, the housing 154, the case 153*a*, and the cover 153*b* may rotate together in the all integrated state.

Figure 7:
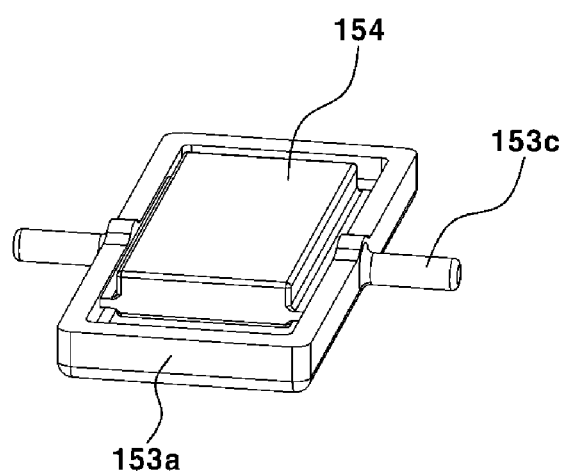
FIG. 7 is a diagram illustrating a state where a housing, into which a gyro sensor is inserted, has been accommodated and fixed to the internal space of a case of the gyro sensor part in an exemplary embodiment of the present disclosure.

FIG. 7 is a diagram illustrating a state where a housing, into which a gyro sensor is inserted, has been accommodated and fixed to the internal space of the case of the gyro sensor part in an exemplary embodiment of the present disclosure, and the housing 154 may be completely fixed to the interior of the case 153*a* by a method such as adhesion so that all of the gyro sensor, the housing 154, and the case 153*a* may be rotated integrally without the housing 154 moving within the case 153*a*.

Further, when the cover 153*b* is assembled above the case 153*a* in a state where the housing 154 into which the gyro sensor 155 is inserted has been accommodated in the internal space of the case 153*a*, it may be fixed by the sealing process between the cover 153*b* and the case 153*a* to completely seal the internal space of the case 153*a* and maintain airtightness. Additionally, the arm rod 156 may be provided in the form of a thin and elongated rod that integrally connects the case 153*a* and the base part 158, and may have a configuration in which a first rod 157*a* integrally coupled to the case 153*a* and a second rod 157*b* integrally formed on the base part 158 have been connected to each other.

The arm rod 156 may be provided in the form of a hollow tube so that the wire 159 for the delivery of the angle detection signal is inserted therein and wired, and the wire 159 may be wired into the first rod 157*a* after penetrating the cover 153*b* through the internal space of the case 153*a* in a state connected to the gyro sensor 155 inside the housing 154. Further, the wire 159 that has passed through the interiors of the first rod 157*a* and the second rod 157*b* of the arm rod 156 in the gyro sensor part 152 may extend into the base part through an internal hole 158*a* of the base part 158, and then is wound around a pipe 141 of the supporter 140 in the spiral form to be connected to the head 130 becoming the outside of the auxiliary floater assembly 150.

Therefore, when the gyro sensor 155 operates, an electrical signal output from the gyro sensor 155 may be delivered to the head 130 via the wire 159. The base part 158 may be coupled to move vertically along the pipe 141 of the supporter 140, which is fixedly disposed vertically and lengthily in the tank, and may be provided in a cylindrical shape to be assembled to become a state fitted into the outer circumference of the pipe 141 of the supporter 140.

As described above, in the case of the state where the base part 158 has been coupled to the outer circumference of the pipe 141 of the supporter 140, the wire 159 having passed through the interior of the arm rod 156 extends into the base part 158 through the internal hole 158*a* of the base part 158 as in FIG. 5, and then as in FIG. 3, may be wound around the outer circumference of the pipe 141 of the supporter 140 in the spiral form.

The base part 158 may be freely moved vertically along the pipe 141 of the supporter 140 and installed to be freely rotatable in the pipe 141 of the supporter 140. Therefore, when the base part 158 is moved or rotated vertically in the pipe 141 of the supporter 140, the arm rod 156, the gyro sensor part 152 connected through the same, and the auxiliary floater 151 may move all together.

However, when the height of the liquid surface is changed in the pipe 141 of the supporter 140 according to the inclined degree of the tank, the gyro sensor part 152 coupled to the pipe 141 of the supporter 140 via the arm rod 156 and the base part 158 rotates relatively with respect to the auxiliary floater 151 always maintaining the horizontal state at the liquid surface.

In the present disclosure, the supporter 140 and the pipe 141 constituting the same are fixed structures fixed integrally to the tank, and are supposed to move together with the tank, and if the tank is inclined, the entire supporter 140 including the pipe 141 is supposed to be inclined integrally together with the tank. Further, if the vehicle, the tank, and the supporter 140 therein are inclined, the arm rod 156, the base part 158, the wire 159, and the like are inclined together, and the gyro sensor part 152 above the auxiliary floater 151 rotates relatively with respect to the auxiliary floater in correspondence with the inclined degree of the tank. At this time, the auxiliary floater 151 may support the gyro sensor part 152, the arm rod 156, the base part 158, the wire 159, and the like in a state floating horizontally on the liquid surface in the tank, and enables the rotation of the gyro sensor part 152 in a state maintaining the horizontal state at the liquid surface when the vehicle and the tank are inclined.

Figure 8:
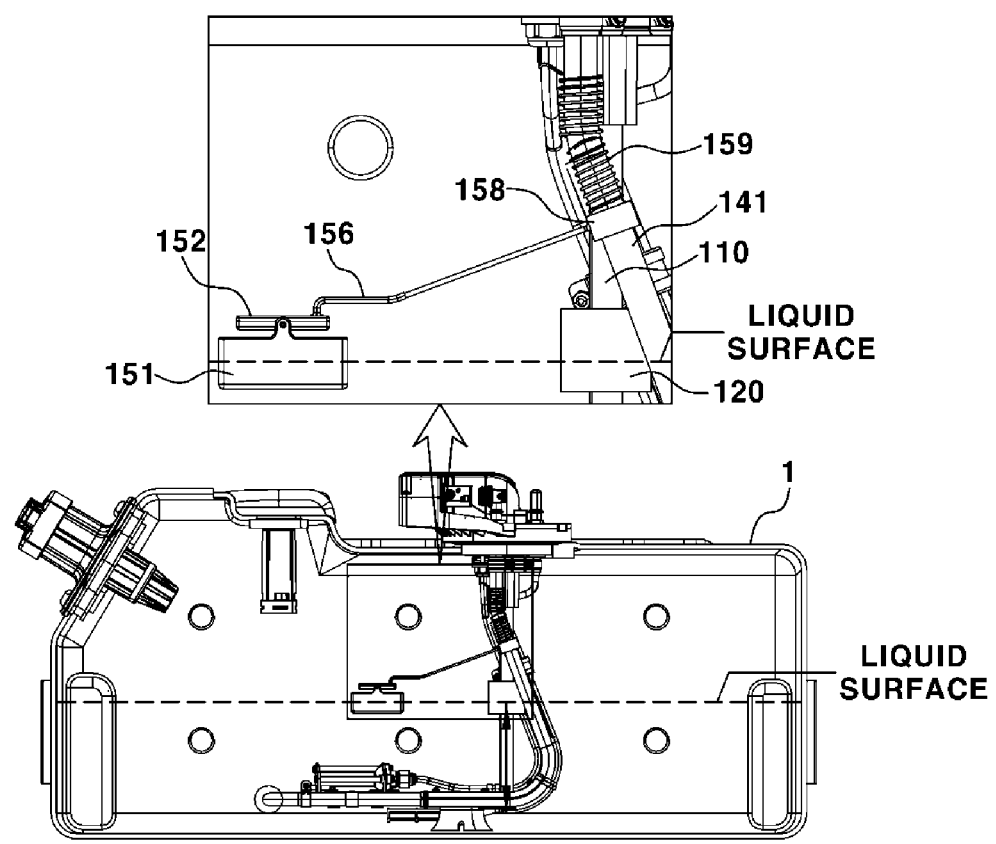
FIG. 8 is a diagram illustrating a state of the liquid level detecting apparatus according to the present disclosure when a vehicle is positioned on the flat and the tank maintains the horizontal state without being inclined.
Figure 9:
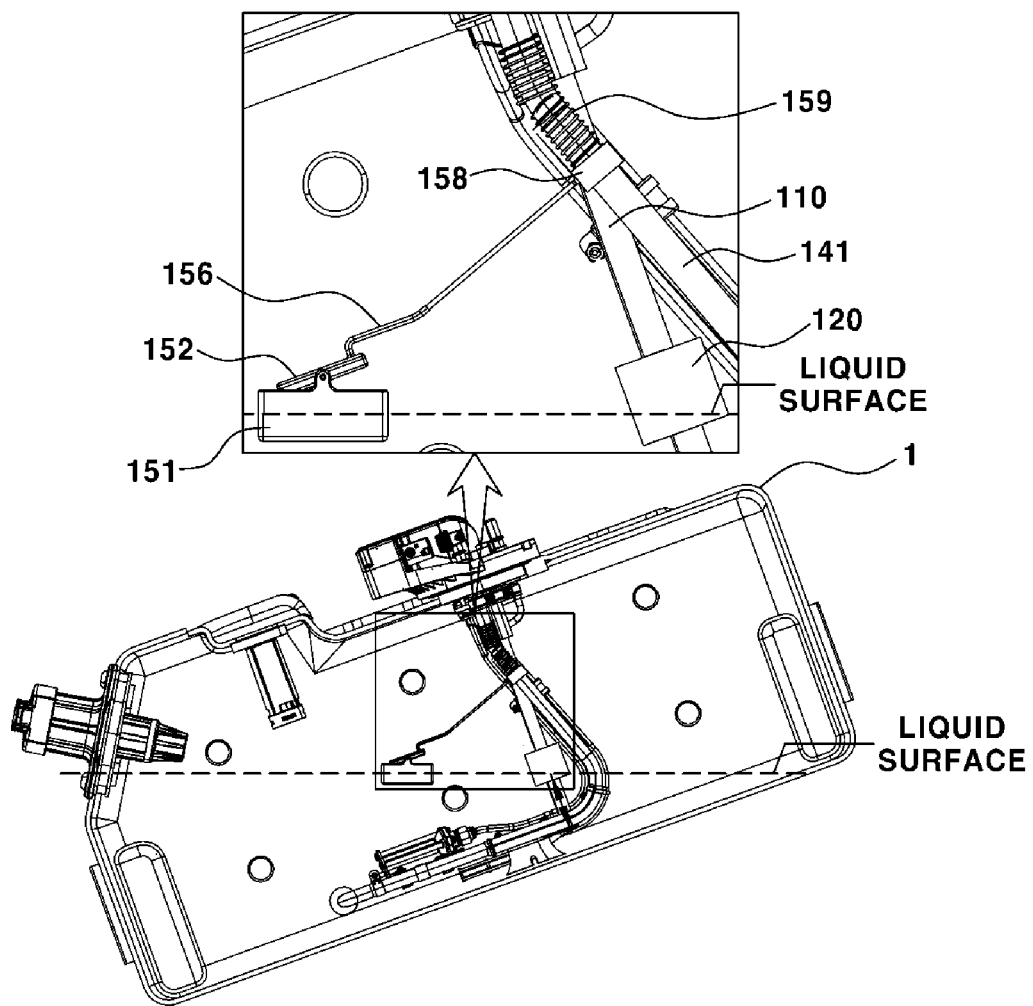
FIGS. 9 and 10 are diagrams illustrating a state of the liquid level detecting apparatus according to the present disclosure when the vehicle is positioned on the ramp and the tank is inclined.
Figure 10:
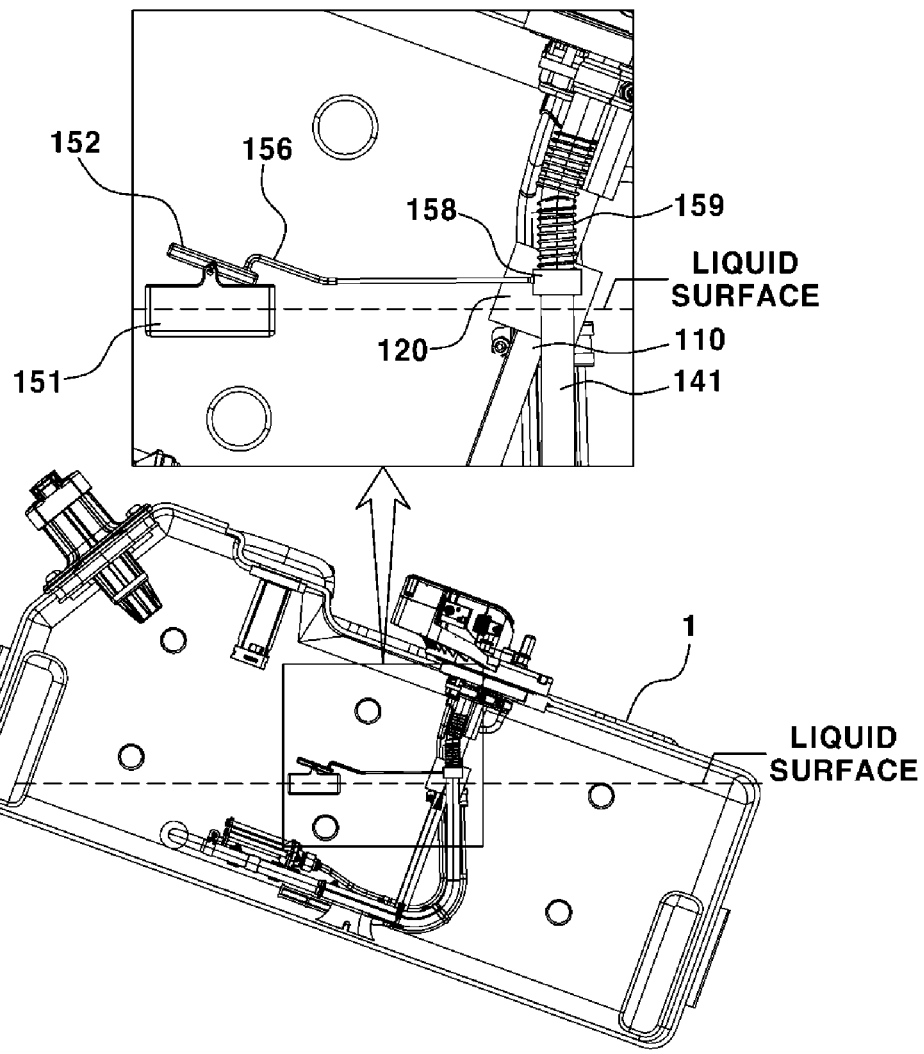

FIG. 8 is a diagram illustrating a state of the liquid level detecting apparatus when the vehicle is positioned on the flat and the tank maintains the horizontal state without being inclined, and FIGS. 9 and 10 are diagrams illustrating a state of the liquid level detecting apparatus when the vehicle is positioned on the ramp and the tank is inclined. As may be seen in FIGS. 8 to 10, when the tank 1 maintains the horizontal state, the liquid surface in the tank also maintains the horizontal state, and the liquid surface in the tank always maintains the horizontal state by gravity even if the tank is inclined to either side.

Likewise, since the liquid surface in the tank always maintains the horizontal state regardless of the maintaining the horizontal state or the inclination of the tank 1, the auxiliary floater 151 floating on the liquid surface always maintains the horizontal state like the liquid surface as well without a posture thereof always being inclined to either side. On the other hand, the gyro sensor part 152 rotatably hinge-coupled to the auxiliary floater 151 may be connected integrally and fixed to the base part 158 via the arm rod 156, and at this time, coupled to the pipe 141 of the supporter 140 installed so that the base part 158 is inclined together with the tank 1.

Therefore, if a vehicle body, the tank 1, and the pipe 141 of the supporter 140 are inclined on the ramp, the gyro sensor part 152 connected to the base part 158 via the arm rod 156 may rotate in interlock with the inclination of the tank 1 above the auxiliary floater 151 even if the liquid surface maintains the horizontal state. At this time, the amount and angle at which the gyro sensor part 152 relatively rotates and is inclined with respect to the auxiliary floater 151 maintaining the horizontal state will vary according to the amount and angle at which the tank 1 is inclined.

In other words, the signal output by the gyro sensor 155 of the gyro sensor part 152 is an angle detection signal indicating the angle of the gyro sensor part 152 with respect to the horizontal, and this angle detection signal indicates a value corresponding to the inclined degree of the tank 1. As a result, if the angle detection signal output by the gyro sensor 155 is applied as a correction signal with respect to the liquid level detection signal according to the position of the main floater 120, more accurate liquid level information in the tank having reflected the inclined degree of the tank 1 may be obtained.

Figure 11:
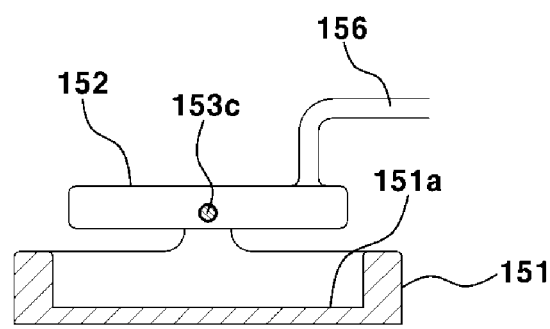
FIGS. 11 to 13 are diagrams illustrating a state of the gyro sensor part in a liquid level detecting state of the present disclosure.
Figure 12:
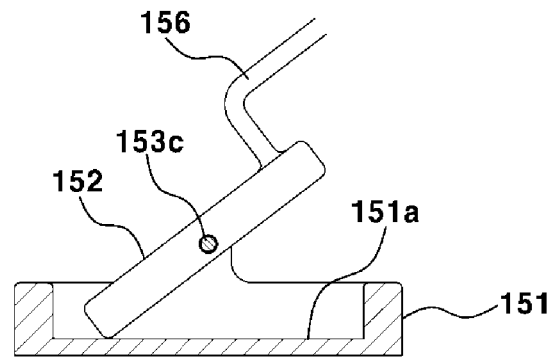
Figure 13:
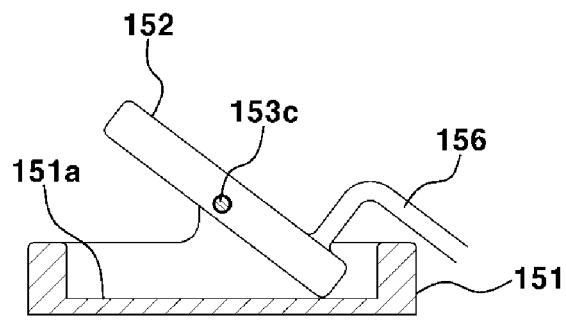

FIGS. 11 to 13 are diagrams illustrating a state of the gyro sensor part in the liquid level detection state, and have illustrated only the cross section of the upper portion of the main floater 120 including the groove part 151*a*. When the tank maintains the horizontal state without being inclined, as illustrated in FIG. 11, the auxiliary floater 151 and the gyro sensor part 152 thereon are also in the horizontal state.

However, if the tank is inclined to either side, the auxiliary floater 151 may maintain the horizontal state together with the liquid surface in the tank, but the gyro sensor part 152 thereon is in a state having rotated relatively with respect to the auxiliary floater 151 as illustrated in FIGS. 12 and 13. In an exemplary embodiment, when the auxiliary floater 151 and the gyro sensor part 152 have a rectangular parallelepiped shape, the groove part 151*a* having a rectangular shape into which the end portion of the rotating gyro sensor part 152 may be inserted may be formed on the upper portion of the auxiliary floater 151 at a certain depth.

If the tank is inclined by a certain level or more, the gyro sensor part 152 may be rotated in a state where at least a portion has been inserted into the groove part 151*a* of the auxiliary floater 151, and if the tank is further inclined substantially and the front end portion or the rear end portion of the gyro sensor part 152 contacts the bottom surface of the groove part 151*a* of the auxiliary floater 151, the rotation of the gyro sensor part 152 may be limited.

Figure 14:
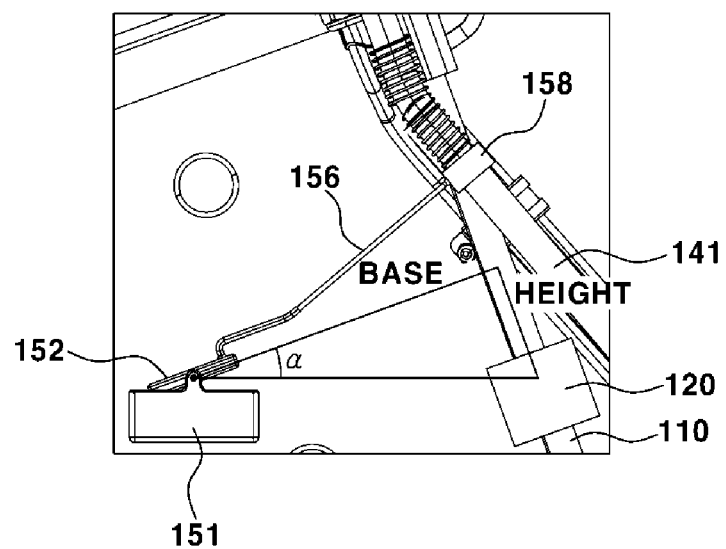
FIGS. 14 and 15 are diagrams for explaining a liquid level correcting method in the present disclosure.
Figure 15:
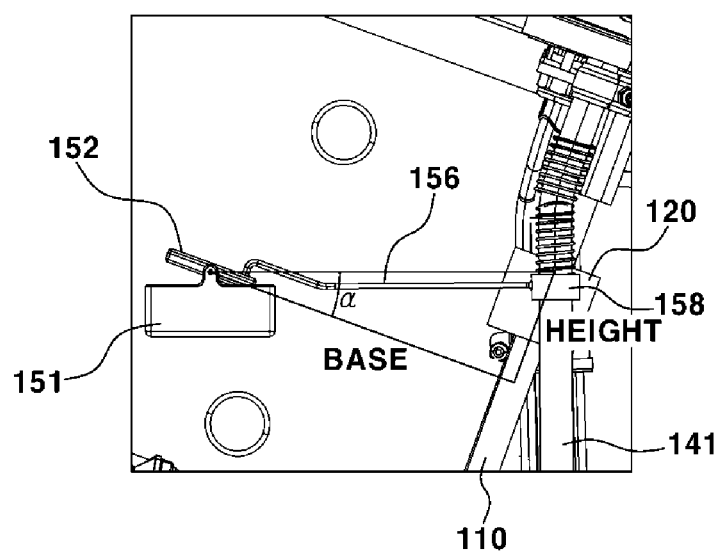

Meanwhile, a method for correcting the liquid level detected by the main floater 120 and the probe 110 using the angle detection signal of the gyro sensor 155 will be described as follows. FIGS. 14 and 15 are diagrams for explaining a liquid level correcting method, and if the angle ($\alpha$) detected by the gyro sensor 155 is used, tan $\alpha$ may be known, where $\alpha$ refers to the inclined angle of the entire gyro sensor part 152 including the gyro sensor 155, and tan $\alpha$ refers to the inclined gradient of the gyro sensor part 152 (gradient (%)=tan $\alpha \times 100$).

Further, the relationship between 'tan $\alpha$=height/base length' is established between the gradient, the height, and the base length. In particular, the base is a connection line connected perpendicular to the longitudinal directional axis of the probe 110 in the gyro sensor part 152, the base length is a length of the connection line, and the length of this connection line is an unchanged fixed value and therefore, is a predetermined constant.

The height is a distance between the point where the connection line is vertically connected among the axis of the probe 110 and the main floater 120. Of course, the axis of the probe 110 represents the axial direction (e.g., the longitudinal direction) line of the probe 110, and the connection line is a line perpendicular to the axis of the probe 110. As a result, if the tan $\alpha$, which is the gradient of the gyro sensor part 152, may be obtained from the signal of the gyro sensor 155, the base length is a known value, such that the height may be calculated from the tan $\alpha$ and the base length.

During the correction, the final liquid level value in the tank may be determined by correcting it in a method of subtracting or adding the calculated height from and to the liquid level value (which is the conventional liquid level detection value) detected by the main floater 120 and the probe 110. In particular, the final liquid level value in the tank is a liquid level value corrected to reflect the inclined degree of the tank using the detection information of the gyro sensor 155, and the liquid residual amount (e.g., the fuel residual amount, the urea water residual amount, or the like) calculated using the corrected liquid level value is displayed on the cluster (e.g., the residual amount display apparatus).

FIGS. 9, 12, and 14 illustrate the inclined state of the tank 1 when the vehicle travels downhill, and the liquid level detected by the main floater 120 becomes a lower value than the liquid level detected on the flat even if the actual liquid (e.g. such as fuel or urea water) residual amount in the tank is the same when the vehicle runs downhill. During the correction, since the correction for converting the liquid level detected by the main floater 120 into the liquid level on the flat using the height value obtained from the signal of the gyro sensor 155 should be performed, a positive (+) correction, which determines a final liquid level (e.g., a value converted into the liquid level on the flat) by summing the height value obtained from the signal of the gyro sensor 155 at the liquid level detected by the main floater 120, may be performed.

On the other hand, FIGS. 10, 13, and 15 illustrate the inclined state of the tank 1 when the vehicle travels uphill, and the liquid level detected by the main floater 120 becomes a higher value than the liquid level detected on the flat when the vehicle runs uphill. Therefore, during the correction, the negative (−) correction, which determines a final liquid level by subtracting the height value obtained from the signal of the gyro sensor 155 at the liquid level detected by the main floater 120, may be performed. If the inclined angle of the tank is a positive (+) value when the vehicle travels uphill, the angle detected by the gyro sensor 155 also becomes a positive (+) value, and conversely, when the inclined angle of the tank is a negative (−) value when the vehicle runs downhill, the angle detected by the gyro sensor 155 also becomes a negative (−) value.

As described above, it may be possible to determine whether the vehicle is traveling uphill or downhill from the signal of the gyro sensor 155, to thus determine the inclined angles of the vehicle and the tank, and furthermore, to determine whether to perform the positive (+) correction, which adds the height value to the liquid level detected by the main floater 120 and the probe 110, or to perform the negative (−) correction, which subtracts the height value from the detected liquid level.

Figure 16:
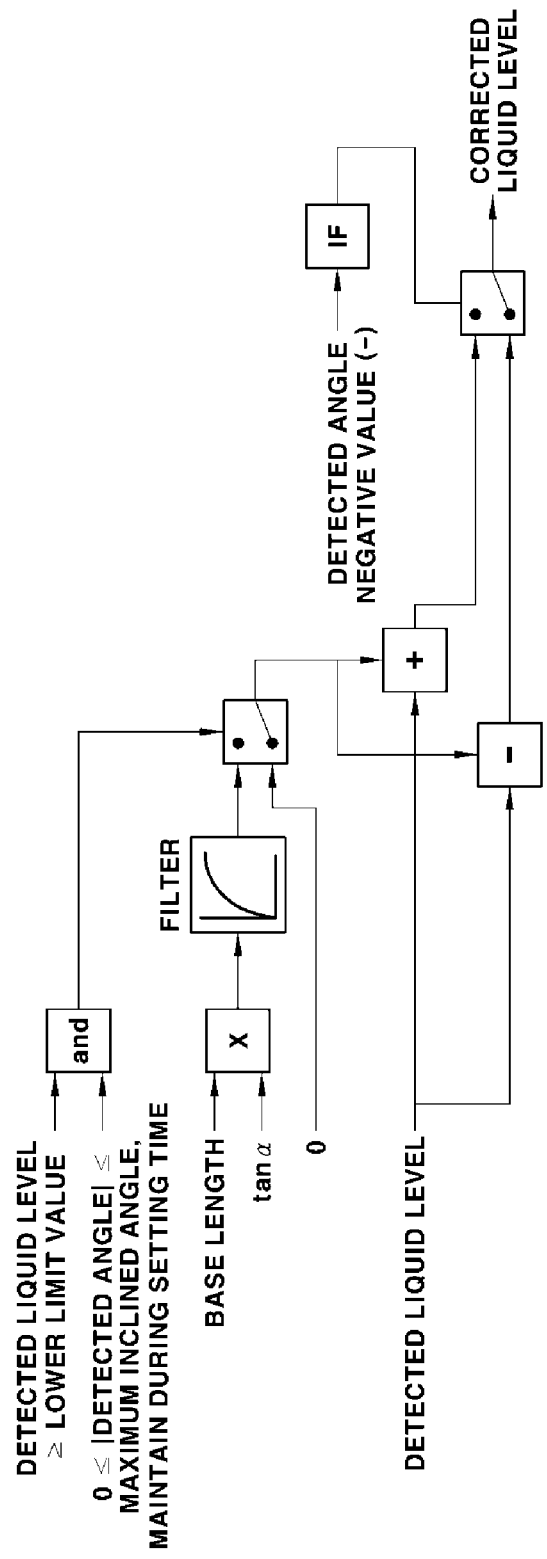
FIG. 16 is a diagram illustrating correction logic in the present disclosure.

FIG. 16 is a diagram illustrating correction logic, and FIG. 17 is a diagram illustrating a configuration for the liquid level detection. FIG. 16 is a diagram illustrating correction logic set in the controller 160 of the liquid level detecting apparatus 100, and the controller 160 may be a cluster controller, or may also be a separate controller mounted in the head 130 of the liquid level detecting apparatus 100. The controller 160 may be configured to calculate the final liquid level value therefrom using, as an input, the general liquid level detection signal generated in and output from the head 130 according to the vertical position of the main floater 120 on the probe 110, and the angle detection signal output from the gyro sensor 155.

Describing with reference to FIG. 16, first, in the controller 160, a liquid level lower limit value, which is the lowest residual amount value in the tank, may be preset, and a normal angle area before the vehicle is overturned may be preset. At this time, the normal angle area may be defined as an area of the maximum inclined angle or less before the vehicle is overturned based on the absolute value of the angle detected by the gyro sensor 155, and therefore, in the controller 160, the maximum inclined angle may be set.

In other words, the normal angle area may be defined as an angle area from 0 to the maximum inclined angle or less. Therefore, the controller 160 may be configured to determine whether the liquid level (which is the liquid level before the correction) in the tank 1 detected by the main floater 120 and the probe 110 is the liquid level lower limit value or greater, and at the same time, determine whether the angle detected by the gyro sensor 155 corresponds to the normal angle area, and if a state where the detected liquid level in the tank is the liquid level lower limit value or greater at the same time, and the angle detected by the gyro sensor 155 is the normal angle area is maintained for a setting time, the liquid level calculation and the correction are performed in the liquid level detecting apparatus 100.

Further, in the liquid level calculation and correction process, the value of tan α is obtained from the angle detection signal of the gyro sensor 155 in the controller 160, and the height value may be calculated by multiplying the value of the tan α by a predetermined base length. At this time, the filter for attenuating the fluctuation may be applied to filter the calculated height value, and the liquid level in the tank detected by the main floater 120 and the probe 110 may be corrected using the filtered height value.

In response to determining that the liquid level in the tank detected by the main floater 120 and the probe 110 is less than the liquid level lower limit value, or the angle detected by the gyro sensor 155 is not in the normal angle area, it may be possible to prevent the correction from being performed by using 0 as the height value. The fact that the angle detected by the gyro sensor 155 is not in the normal angle area, that is, the absolute value of the angle detected by the gyro sensor 155 is greater than the maximum inclined angle indicates that it may be a state where the vehicle has been overturned.

In the process of correcting the liquid level in the tank detected by the main floater 120 and the probe 110 using the height value, the controller 160 may be configured to determine the inclined directions of the vehicle, the tank, and the gyro sensor part 152 from the signal of the gyro sensor 155, and calculate the final liquid level value by performing the negative (−) correction, which subtracts the calculated height value from the liquid level in the tank detected by the main floater 120 and the probe 110 in the case of the uphill running at which the angle value detected by the gyro sensor 155 indicates a positive value.

On the other hand, in the case of the downhill running at which the angle value detected by the gyro sensor 155 indicates a negative value, the final liquid level value is calculated by performing the positive (+) correction, which adds the calculated height value to the liquid level in the tank detected by the main floater 120 and the probe 110. As described above, if the final liquid level value is determined by the controller 160, the residual amount display apparatus 200 may be configured to display the fuel residual amount corresponding to the final liquid level value determined by the controller 160.

Therefore, according to the present disclosure, it may be possible to correct the liquid level value detected by the main floater 120 and the probe 110 using the angle detection signal output from the gyro sensor 155, thereby obtaining the inclined directions of the vehicle and the tank and the liquid level value in the tank having reflected their degrees more accurately.

As described above, although the exemplary embodiments of the present disclosure have been described in detail, the scope of the present disclosure is not limited thereto, and various modifications and improvements of those skilled in the art using the basic concept of the present disclosure defined in the following claims are also included in the scope of the present disclosure.

What is claimed is:

1. A liquid level detecting apparatus of a tank for a vehicle, comprising:
   a main detecting part configured to detect the liquid level of the liquid in a tank to output a liquid level detection signal corresponding to the liquid level;
   an auxiliary floater assembly including an auxiliary floater provided to float on the liquid surface of the liquid in the tank, and a gyro sensor mounted to the auxiliary floater, and configured to output an angle detection signal corresponding to an inclined angle of the tank; and a controller configured to determine a final liquid level value by correcting a liquid level value obtained from the liquid level detection signal based on the angle detection signal;

wherein the auxiliary floater assembly further includes:
a base part installed to be movable vertically along a fixed structure in the tank;
a gyro sensor part having the gyro sensor connected and supported to the base part through an arm rod, and for outputting the angle detection signal corresponding to the rotated and inclined angle, and
an auxiliary floater provided to float on the liquid surface of the liquid in the tank, and installed so that the gyro sensor part is rotatable.

2. The liquid level detecting apparatus of the tank for the vehicle of claim 1, wherein the main detecting part includes:
a sender probe installed in the tank;
a main floater provided to move along the sender probe in interlock with a change in the liquid surface of the liquid in the tank; and
a head for generating and outputting the liquid level detection signal according to a position of the main floater on the sender probe.

3. The liquid level detecting apparatus of the tank for the vehicle of claim 1, wherein the fixed structure in the tank is a pipe fixedly disposed vertically and lengthily in the tank, and wherein the base part is provided in a cylindrical shape to be fitted into the outer circumference of the pipe and therefore, is rotatable in the pipe while being movable vertically along the pipe.

4. The liquid level detecting apparatus of the tank for the vehicle of claim 3, wherein the arm rod is provided in the form of a hollow tube, wherein a wire connected to the gyro sensor to deliver the angle detection signal is installed along the interior of the arm rod, and wherein the wire passes through the interior of the arm rod and is wound around the pipe in a spiral form to be connected to the outside of the auxiliary floater assembly.

5. The liquid level detecting apparatus of the tank for the vehicle of claim 1, wherein the gyro sensor part is installed to be rotatable above the auxiliary floater, and wherein a groove part of a predetermined depth, into which at least a portion of the gyro sensor part rotated thereon is inserted, is formed on the upper portion of the auxiliary floater.

6. The liquid level detecting apparatus of the tank for the vehicle of claim 5, wherein the auxiliary floater and the gyro sensor part have a rectangular parallelepiped shape, and wherein the groove part, into which the end portion of the rotated gyro sensor part is inserted, is formed on the upper portion of the auxiliary floater at a certain depth.

7. The liquid level detecting apparatus of the tank for the vehicle of claim 6, wherein the gyro sensor part is hinge-coupled to the central position of the auxiliary floater in the longitudinal direction, and wherein the arm rod is connected to a portion spaced at a predetermined distance apart from a portion hinge-coupled to the auxiliary floater among the gyro sensor part.

8. The liquid level detecting apparatus of the tank for the vehicle of claim 5, wherein a drain hole, through which the liquid filled in the groove part is discharged, is formed through the upper portion of the auxiliary floater.

9. The liquid level detecting apparatus of the tank for the vehicle of claim 1, wherein the gyro sensor part includes:
a case rotatably coupled to the auxiliary floater;
a housing accommodated in and fixed to the interior of the case;
the gyro sensor inserted into and fixed to the interior of the housing; and
a cover installed in the case into which the housing and the gyro sensor are inserted to enclose the interior of the case.

10. The liquid level detecting apparatus of the tank for the vehicle of claim 1, wherein the main detecting part includes:
a sender probe installed in the tank; and
a main floater provided to move along the sender probe in interlock with a change in the liquid surface of the liquid in the tank, and
wherein in the controller,
when the inclined angle of the gyro sensor part obtained from the angle detection signal is $\alpha$, the length of a connection line connected perpendicular to the longitudinal directional axis of the sender probe of the main detecting part in the gyro sensor part is a base length, and the distance between a point to which the connection line is connected vertically in the axis of the sender probe and the main floater is a height, and
the height from the $\alpha$ and the base length are calculated by the controller using the relationship of 'tan $\alpha$=height/base length,' and the corrected final liquid level value is obtained as a value obtained by adding or subtracting the height to or from the liquid level value obtained from the liquid level detection signal.

11. The liquid level detecting apparatus of the tank for the vehicle of claim 10, wherein the controller is configured to determine the inclined direction of the tank from the angle detection signal, and the height is added to or subtracted from the liquid level value according to the inclined direction of the tank.

12. The liquid level detecting apparatus of the tank for the vehicle of claim 1, wherein the controller is configured to perform the correction, when a state where the angle obtained from the angle detection signal corresponds to a predetermined normal angle area is maintained for a setting time, and the liquid level value obtained from the liquid level detection signal is a value of a predetermined lower limit value or more.

13. The liquid level detecting apparatus of the tank for the vehicle of claim 12, wherein the predetermined normal angle area is set to be from 0 to a predetermined inclined angle or less.

* * * * *